United States Patent [19]
Jones, Jr.

[11] 3,880,457
[45] Apr. 29, 1975

[54] TRAILER FOR TRANSPORTING VEHICLES
[76] Inventor: Paul Jones, Jr., 4347 Moon Light Dr., Holly, Mich. 48442
[22] Filed: May 24, 1973
[21] Appl. No.: 363,350

[52] U.S. Cl................................................ 296/1 A
[51] Int. Cl............................................. B60p 3/08
[58] Field of Search ....... 296/1 R, 28 M, 28 K, 1 A; 280/106 T

[56] References Cited
UNITED STATES PATENTS

| | | | |
|---|---|---|---|
| 2,492,829 | 12/1949 | Baker | 296/1 A |
| 3,116,844 | 1/1964 | Blunden et al | 296/1 A X |
| 3,690,717 | 9/1972 | Taylor | 296/1 A |

Primary Examiner—Stanley H. Tollberg
Attorney, Agent, or Firm—Arnold S. Weintraub

[57] ABSTRACT

A trailer for transporting vehicles includes simplified means for raising and lowering the sections of the upper deck of the trailer. The trailer further includes lift means for adjusting the height of the forwardmost lower deck section with relation to the intermediate lower deck section. The present trailer complies with all sixty-foot or shorter legal limits, all state and federal regulations can be employed for transporting both commercial and domestic vehicles, including pick-up trucks, vans, standard size automobiles, compacts, sub-compacts and foreign imports. By the practice of the present invention it is possible to directly load two vans over three full size sedans which provides a major advance in the art.

8 Claims, 4 Drawing Figures

PATENTED APR 29 1975 3,880,457
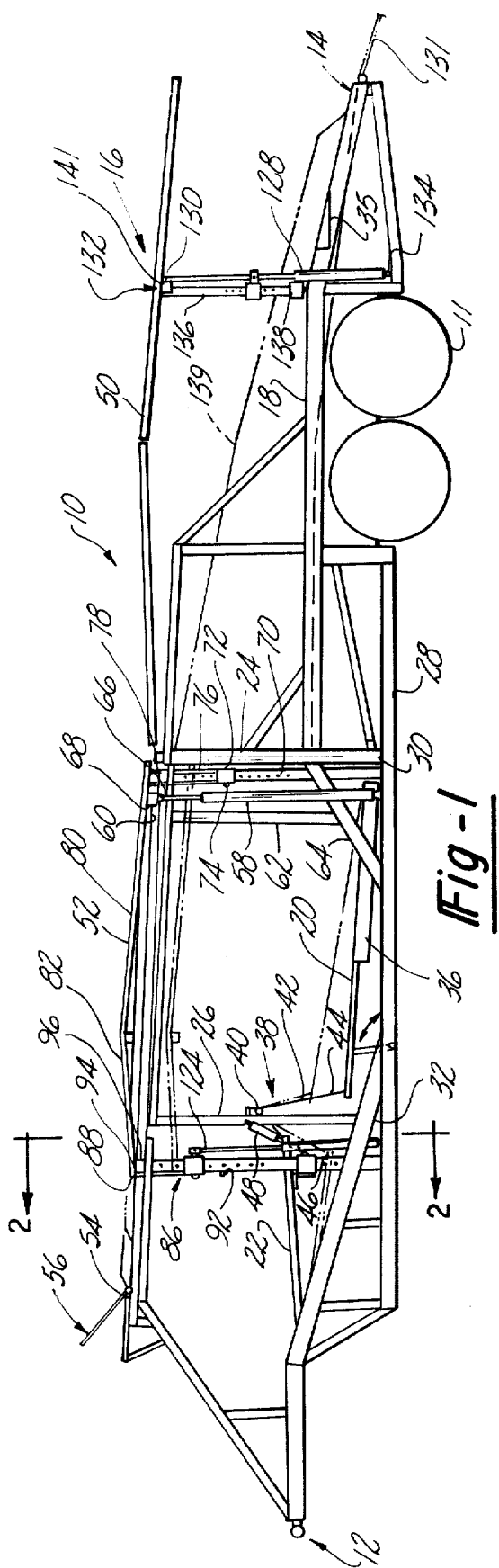
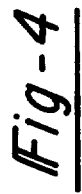
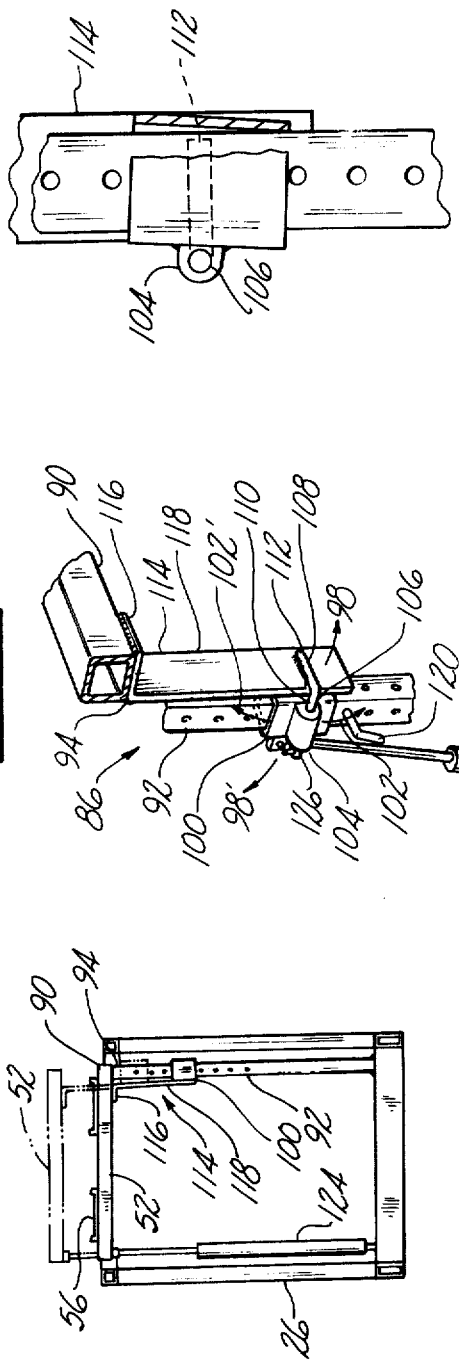

TRAILER FOR TRANSPORTING VEHICLES

BACKGROUND OF THE INVENTION

1. Field of the Invention

The present invention relates to trailers and, in particular, to trailers for transporting vehicles. Even more particularly, the present invention relates to trailers for transporting vehicles which incorporate therewithin means for adjusting the height of both the upper and lower decks and which is of reduced cost and simplicity of construction.

2. Prior Art

The use of carriers or trailers to transport a plurality of vehicles, such as automobiles, trucks and the like has long been known. Generally speaking, these trailers comprise two-tiered sectional deck or ramp systems designed to accomodate a plurality of automotive vehicles. The sections of the upper decks are, usually, vertically adjustable sections which have their heights varied in order to load and store vehicles thereon in transporting them from one location to another. Generally, the vertical adjustments are made possible through the use of hydraulic means. See Inter Alia, U.S. Pat. Nos. 3,084,970 and 3,113,800.

Moreover, in loading the carrier a plurality of skids are employed to facilitate traversal of deck sections as well as going from the first deck to the second deck. These skids are not of suitable stability to be adequately safe.

Also, in loading a carrier it is often times required because of height factors, to provide a plurality of height adjustments in order to ensure adequate height clearance between the upper and lower deck while still rendering transport safe. Many times, this requires "backing in" of a car or other vehicle onto the decks to ensure stability and height clearance.

Compounding the difficulties and problems associated with the trailers is the fact that they are subject to federal regulations, state laws, and municipal ordinances regarding their loads, lengths and the like, such as the "sixty-foot" or shorter, legal limit which requires the trailer to be a maximum of 60 feet in length with a load not in excess of 8 feet wide and 13 feet, 6 inches high.

These problems amplify the necessity for providing new trailers of the type under consideration herein, which are less expensive to manufacture, of increased efficiency, and which comply with all regulations presently governing such trailers.

It is to these and other problems to which the present invention is directed.

SUMMARY OF THE INVENTION

The present invention provides a trailer for transporting vehicles which incorporates therewithin certain features which lead to reduced cost of construction, increased efficiency and which complies with all presently existing regulations.

The present trailer or carrier generally comprises a two-tiered support frame structure, wherein each tier includes independent track sections or sections. Each of the sections of the tiers cooperate to define a first or lower deck and a second or upper deck. The rearwardmost section of the upper deck has means associated therewith for raising and lowering the section such that it overlies the rearwardmost section of the lower deck during loading and is raised back in linear alignment with the other upper deck sections during transport and normal city use.

With regard to the sections of the lower deck, the present invention also includes means for adjusting the height of one section in relation to its adjoining section, and also includes independently operable means associated with the load support means for fixing the one section in position. Also, included are means associated with the sections for lowering vehicles stored therewith, which is solely manually operable.

These and other features of the present invention will become apparent from a consideration of the following detailed description and accompanying drawing. In the drawing, like reference characters refer to like parts throughout the several view, in which:

BRIEF DESCRIPTION OF THE DRAWING

FIG. 1 is a side elevational view of one of a trailer or carrier incorporating the features of the present invention;

FIG. 2 is an end elevational view of the trailer of FIG. 1 taken along the line 2—2 thereof;

FIG. 3 is a perspective view, partially broken, of the means for supporting an upper deck section employed in the practice of the present invention; and FIG. 4 is a side elevational view, partly in section and partially broken, of the means for supporting an upper deck employed in the practice of the present invention.

DESCRIPTION OF THE PREFERRED EMBODIMENTS

Now, with reference to the drawing and, in particular, FIG. 1, there is depicted therein a trailer or carrier, generally indicated 10, for transporting vehicles. The trailer 10 depicted in the drawing is a 45 foot trailer which meets substantially all 60 foot legal limits and can, therefore, be used in both city and highway transporting. Because each side of the trailer is similarly configured, the following description will be with reference to a single side.

As is known to those skilled in the art, the trailer, of the type under consideration herein, is generally a tandem axle device adapted to be connected at its forward end 12, usually through a fifth wheel arrangement to a prime mover, such as a semi-truck or tractor (not shown). The trailer or carrier moves or translates through wheels 11 mounted on an axle (not shown).

The trailer hereof generally comprises a first or lower deck 14 and a second or upper deck 16. The lower deck 14 includes section 18, 20, and 22, respectively. Each of the sections 18, 20, and 22 retain a vehicle therewithin and thereby function as a storage well. Each of the track sections or sections 18, 20, and 22, as is known to those skilled in the art, has a pair of supported spaced apart ramps (not shown) upon which an automotive vehicle is driven and loaded.

Each of the sections of the trailer are defined by pairs of upstanding frame posts 24 and 26, one post per pair being on one side of the vehicle. The frame posts 24 are fixedly secured to the base frame 28 at its lowermost end 30, such as by welding, or the like. The frame post 26 is secured to a cross strut 32 which is in turn secured to the base frame 28 as shown.

The trailer further includes further strutting and support posts, all of which are employed conjointly to provide structural integrity to the trailer 10 to enable the trailer to carry out its intended function. Also included is framing for the upper and lower decks, as shown. This framing, also, provides support to the trailer.

Still referring to FIG. 1, the sections 18 and 20 each include a pocket lift, 35 and 36, respectively. The pocket lifts essentially comprise gaps or apertures in the sections 18 and 20 which accommodate the tiers of the vehicle. Thus, when a vehicle is driven over the lifts, the tires drop down therethrough, thereby lowering the vehicle without danger to the gas tank. Flaps pivotally hinged proximate the lifts, overlie the lifts during loading of the carrier.

The present invention further includes cable lift means 38 for adjusting the relative heights of track sections 20 and 22 with respect to each other when a load is deposited thereon. The cable lift means or means 38 includes a pulley 40 fixedly attached to the frame post 26. A cable 42 fits on the pulley and has its ends 44, 46 fixed securedly to track sections 20, 22, respectively. As is shown in dotted lines in FIG. 1, the cable lift means 40 renders the two sections 20, 22 vertically adjustable in height with relationship to each other. Thus, when a load is placed on section 22, section 20 will be elevated to adjust its height accordingly. Likewise, section 22 will have its height adjusted when a load is placed on section 20. The initial or desirable height of section 22 can be provided by a hydraulic cylinder 48 and lift strap operatively associated and connected to the section 22 in a manner well known and is maintained thereat through suitable means of pinning to a perforated post 92; a stanchion (shown by arrows) rotatably affixed to the base frame 28 can be rotatably locked beneath and in abutment with the section 20 after adjustment by the means 38 to maintain the relative height of the section 20.

Referring now to FIGS. 1 and 2, the upper deck 16 of the trailer 10 includes sections 50, 52, and 54, respectively. Each of the sections are independently operable. Sections 52 and 54 are spanned by flip-overs or ramps or ramp sections 56 which can be manually emplaced on the track sections or otherwise emplaced such as by hinged rotation or the like. The sections 50 and 52 do not require any ramps or spans therebetween, nor any other structure, such as an intermediate deck or the like.

In accordance with the present invention, the section 52 is rendered vertically adjustable by a single pair of conventional heavy duty cylinders 58 disposed, one on each side of the trailer 10. With reference to one side of the trailer the cylinder 58 is, preferably, a hydraulic cylinder with sufficient output to controllably raise and lower the section 52. The cylinder 58 extends between the base frame 28 and frame 60 of the section 52. The cylinder 58 is mounted parallel to and inbetween the frame post 24 and a support member 62. A cross strut 64 has an aperture therethrough through which is disposed the lower portion of the cylinder 58. The cylinder 58 is fixed in position by welding or the like. In securing the cylinder 58 to the frame of the deck, angle brackets or the like can be used for interconnection to provide further structural rigidity to the system. Preferably, the upper end of the cylinder is provided with a pivot connection 66 which is in turn fixedly connected to a cross beam 68 which traverses the section 52. However, the cylinder can be attached to a beam connected to the support post 24. The cylinder is hydraulically operated through suitable conventional means (not shown).

Disposed between the cylinder 58 and the frame post 24 is an apertured support post 70 which is preferably a square apertured beam. The post 70 extends between the frame 28 and the upper deck sections 52. A slide collar 72 is mounted about the post 70. The slide collar has a right angle tube 74 fixed to its periphery. The tube 74, is in turn, fixedly secured to a strap 76 at one end thereof. The other end of the strap 76 is connected to a transversely-extending cross beam 78. As the cylinder 58 is extended vertically upward or retracted vertically downward, the section 52 is elevated or lowered accordingly, as shown in the dotted lines in FIGS. 1 and 2. Because the strap 76 is fixed to the deck through the cross member 78, the strap 76 will, accordingly, also be raised, as will the slide collar 72. By insering a pin (not shown) through an aperture in the post 70 immediately below the point where the collar has stopped, the deck, thus, becomes fixed and retained in position. Thus, the strap and collar cooperate with the pin to define means for retaining the upper deck section in position.

As shown in FIG. 1, the upper deck section 52 includes a first or rear portion 80 and a second or forward portion 82, the two portions being angularly inclined with respect to each other. A transverse cross beam 84 (not shown) which reinforces the junction point or line, can be employed, as shown. However, its presence is not critical to the present invention.

In order to maintain and support the load placed on the section 52, especially on its forward portion 82, there is provided means 86 which serves to support the load. The means 86 is disposed at the forwardmost end 88 of the section 52.

The means 86 is so constructed and designed that "flop over" thereof is obviated thereby preventing collapse of the deck and the resulting costly damage to any vehicle loaded thereon.

As shown more distinctly in FIGS. 2–4, the means 86 includes a frame member 90 which is fixed to the section 52 proximate the end 88 thereof. An apertured or perforated rectangular tubular member 92 is fixedly secured as at 94, to the frame structure 96 of the trailer 10 at one end thereof and to the base frame 28 at its other end.

A slide collar 100 is mounted around the tubular member 92 as shown. The collar 100 is slightly greater in diameter than the tubular member. Thus, when the collar pivots according to the direction of the arrows 98, 99 or 102 and 102', the member 92 will accordingly react and take up the forces exerted thereon (FIG. 3). Thus, as in essence, the collar 100 floats on the fixed tubular member 92.

As will subsequently become apparent, the slide collar 100 is responsive to movement of the cylinder 58 by suitable means. Welded or otherwise secured to the exterior periphery of the collar or slide collar 100 on one side thereof is a pipe 104 having an aperture 106 formed therethrough. Inserted through the aperture and retained in the pipe 104 is a right angle pin 108. The right angle pin 108 extends along two sides of the collar 100 as shown, one angular side or portion 110 of the pin being substantially encased in the pipe and the other angular portion 112 being free and extending substantially across the width of the side of the member 92 associated therewith.

As shown in FIG. 3, fixedly secured to the frame member 90 is an L-shaped strap 114 having a first angular leg 116 secured to the frame member 90 such as by welding or the like. The other leg 118 of the strap 114 depends downwardly from the member 90. The leg 188 has securedly affixed thereto the free side 112 of the pin 108, such as by welding or the like.

Because the frame member 90 is secured to the deck, the collar 100 is vertically raisable or lowerable with respect to the tubular member 92 which is fixed to the trailer 10 onto frame strut 96.

It is apparent from the preceding that when the cylinder 58 is extended or lowered, the strap 114 will accordingly raise or lower in response to the movement of the cyliner. The movement of the strap 114 will, then, necessarily cause the collar 100 to raise and lower with respect to the tubular member 92. It will be appreciated by those skilled in the art that other means can be depolyed to render the collar 100 responsive to movement of the cylinder 58.

When the height of the section 52 is properly adjusted, a pin 120 is inserted through an aperture 122 (not shown) in the tubular member 92, thereby locking the means 86 in position.

In order to provide more complete adjustment for the forwardmost end 88 of the section 52, a hydraulic cylinder 124 is associated with the means 86. The cylinder 124 extends between the deck section 52 and the base frame 28. The cylinder is connected to the means 86 through a suitable strap 126 or the like, at the slide collar 100. Thus, when the forward end 88 of the section is to have its height adjusted the cylinder 124 is, accordingly, extended or retracted. The slide collar 100 will then move responsively to the movement of the cylinder 124.

Referring again to FIG. 1, it is contemplated that the space between the forward end 88 of the section 52 and the deck section 54 be open. A pair of slide ramps, analogous to the ramps 56, can be employed to spand the gap.

In order to facilitate the loading of the upper deck 16, the section 50 is rendered pivotally adjustable from a substantially horizontal position to an inclined position as shown in line 139. A cylinder 128, which is hydraulically operable, is pivotally connected to frame member 132 of deck section 50 at one end and to the base frame 26 at 134 at its other end. A perforated support post 136 extends between the base frame 28 and the deck section frame 132 proximate the cylinder 128. The post 136 has a slide collar 138 mounted thereon which is connected to the deck section 50 through the frame member 132, via an interconnecting tube 141.

When the cylinder rod is retracted the deck section 50 pivotally lowers and rotates to substantially overlie lower deck section 18. In lowering the forward end of the section 52, the section 50 remains proximate elevated section 52, thus permitting direct driving from section 50 onto section 52 and as shown in phantom line 139. In loading section 50, in its lower position, 13 foot skids 131 extending between section 14 and the ground are all that need be employed. After loading the other upper deck sections, a car is driven up on section 50 which is then elevated by actuation of the cylinder 128. When the section has returned to its normal position in generally linear alignment with secion 52, a pin (not shown) is inserted through an aperture in the post 136 immediately below the collar 138. Intermediate positions can also be achieved.

It is to be understood that in the practice of the present invention any suitable framing structure can be given to the trailer with regard to structural soundess and the like. Moreover, the precise loading of the trailer is not limited. Rather, any suitable method conventionally employed can be utilized herein. However, the present carrier structure enables direct forward driving loading. There is no need to back a car onto the carrier.

In other words, after the upper deck is loaded and section 50 returned to is transport position, the lower deck is loaded by driving the vehicles forwardly thereinto.

It should be pointed out that because of the pivotal operation of deck section 50, it is possible to load two vans on the upper deck over three full size sedans in the lower deck. Moreover, because of the adjustability of the deck sections it is possible to load two vans over two full-size cars and a pick-up truck in the lower sections wherein there is a car over the wheel housing and a car over the bulkhead, with the pick-up in the middle lower section or belly.

Furthermore, and as hereinbefore noted, the present trailer complies with all 60 foot legal limits, and can be used in both city and open road transporting, since only cylinders 58 and 128 need be adjusted for city use, while the other remain stationary.

Having thus described my invention, what is claimed is:

1. A trailer for transporting vehicles comprising:
   a. a lower deck comprising first, second and third sections;
   b. an upper deck spaced apart from the lower deck, the upper deck having at least one section which is vertically raisable and lowerable;
   c. a cylinder mechanism for raising the section;
   d. means for fixing the section in position, said means comprising:
      1. an apertured frame post extending between the upper and lower deck,
      2. a slide collar mounted on the post,
      3. a strap connected at one end to the upper deck and to the collar at its other end, the strap being responsive to movement of the cylinder to thereby raise and lower the collar, and
      4. means insertable into an aperture of the post immediately below the position of the collar;
   e. means for supporting a load placed on the section;
   f. at least one section of the upper deck being pivotally moveable between a horizontal and inclined position;
   g. means for fixing the pivotally moveable section in the horizontal position; and
   h. means for adjusting the relative height between the second and third sections of the lower deck, the means for adjusting the height comprising:
      1. a pulley fixedly secured to a frame post of the trailer and extending between the upper and lower deck, and
      2. a cable passing through the pulley, one end of the cable being attached to the second section and the other end of the cable being attached to the third section.

2. The trailer of claim 1, wherein the means for supporting the load comprises:
   a. an apertured tubular member pivotally connected to the frame of the trailer associated with the upper deck;
   b. a slide collar mounted on the tubular member;

c. a strap interconnecting the collar to the section such that the collar is axially slidable along the tubular member in response to the movement of the section; and d. means insertable into an aperture immediately below the position of the collar.

3. The trailer of claim 2, wherein the section includes a first rearward portion and a second forward portion, the means for supporting the load being disposed proximate the forwardmost end of the forward portion.

4. The trailer of claim 3, wherein the cylinder extends between the base frame of the trailer and is pivotally connected to the frame of the trailer associated with the upper deck, the cylinder being mounted proximate the rearwardmost end of the rearward portion of the section.

5. The trailer of claim 4, wherein the means for supporting the load further includes a cylinder operatively connected thereto for adjusting the position of the forwardmost portion of the section.

6. The trailer of claim 1 which further includes a cylinder mechanism for adjusting the initial height of the third section, the cylinder being operatively associated with the means for supporting the load.

7. The trailer of claim 1, wherein the first and second sections each have a pocket lift associated therewith for accommodating the tires of a vehicle stored therewithin.

8. In a tractor-trailer assembly for transporting vehicles of the type having an upper deck and a lower deck, the upper deck and lower deck each having a plurality of sections for loading a vehicle thereon including a rearwardmost upper deck section having a forward and rearward end and a rearwardmost lower deck section having a forward end and a rearward end, the improvement which comprises:

means for pivotally raising and lowering the rearwardmost upper deck section between a first substantially horizontal position to a second inclined position, the means comprising:

a. a hydraulic cylinder having an extensible and retractable cylinder rod pivotally connected at one end thereof to the rearwardmost upper deck section and to the rearwardmost lower deck section at the other end thereof, b. an apertured support post extending between the rearwardmost lower deck section and the rearwardmost upper deck section;

c. a slide collar mounted on the support post and connected to the cylinder, the slide collar being responsive to movement of the cylinder rod, d. means for actuating the cylinder to cause extension or retraction of the cylinder rod, e. means insertable into an aperture of the post immediately below the collar, and wherein retraction of the cylinder rod pivotally rotates the rearwardmost upper deck section such that the rearward end overlies and abuts and remains within the rearward end of the rearwardmost lower deck section, the forward end of the rearwardmost upper deck section remaining substantialy stationary, whereby the trailer may be loaded within the 60 foot legal limit.

* * * * *